US010655649B2

(12) United States Patent
Digesù et al.

(10) Patent No.: US 10,655,649 B2
(45) Date of Patent: May 19, 2020

(54) HYDRAULIC CIRCUIT FOR USE ON CVT VEHICLE

(71) Applicant: CNH Industrial America LLC, New Holland, PA (US)

(72) Inventors: Pasquale Digesù, Modena (IT); Maurizio Vescovini, Carpi (IT); Paolo Casali, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 76 days.

(21) Appl. No.: 15/764,086

(22) PCT Filed: Sep. 23, 2016

(86) PCT No.: PCT/EP2016/072736
§ 371 (c)(1),
(2) Date: Mar. 28, 2018

(87) PCT Pub. No.: WO2017/055191
PCT Pub. Date: Apr. 6, 2017

(65) Prior Publication Data
US 2018/0274564 A1  Sep. 27, 2018

(30) Foreign Application Priority Data

Sep. 29, 2015 (IT) .............................. UB2015A3995

(51) Int. Cl.
*F15B 11/17* (2006.01)
*F16H 61/4078* (2010.01)
(Continued)

(52) U.S. Cl.
CPC .............. *F15B 11/17* (2013.01); *E02F 9/22* (2013.01); *F01M 1/02* (2013.01); *F01M 1/16* (2013.01);
(Continued)

(58) Field of Classification Search
CPC .... F01M 1/02; F01M 2001/0253; F01M 1/16; F15B 11/17; F16H 57/0435; F16H 57/0441; F16H 57/0494
See application file for complete search history.

(56) References Cited

U.S. PATENT DOCUMENTS 3,945,208 A * 3/1976 O'Connor ............. F15B 21/041
60/420
4,517,800 A * 5/1985 Karakama ................ B62D 5/32
180/403

(Continued)

OTHER PUBLICATIONS

Notification of Transmittal of the International Search Report and the Written Opinion of the International Searching Authority, or the Declaration dated Nov. 2, 2016 for International Application No. PCT/EP2016/072736 (10 pages).

*Primary Examiner* — Thomas E Lazo
*Assistant Examiner* — Matthew Wiblin
(74) *Attorney, Agent, or Firm* — Rickard K. DeMille; Rebecca L. Henkel (57) ABSTRACT

A hydraulic system for a work vehicle has a high pressure circuit for providing high pressure hydraulic fluid, a medium pressure circuit for providing medium pressure hydraulic fluid, and a low pressure hydraulic circuit for providing low pressure hydraulic fluid. The high pressure circuit has a variable displacement charge pump that provides pressurized hydraulic fluid only to a high pressure variable displacement pump according to demand, which provides the further pressurized hydraulic fluid to a priority valve according to demand. The medium pressure circuit has a medium pressure variable displacement pump that provides pressurized hydraulic fluid according to demand. The low pressure circuit has at least one low pressure variable displacement (Continued)

pump that provides pressurized hydraulic fluid by way of an oil cooler and/or an oil cooler bypass controlled by a proportional valve.

11 Claims, 4 Drawing Sheets

(51) Int. Cl.
| | |
|---|---|
| *F16H 57/04* | (2010.01) |
| *F16H 61/00* | (2006.01) |
| *F04B 23/04* | (2006.01) |
| *F04B 23/02* | (2006.01) |
| *F04B 49/00* | (2006.01) |
| *E02F 9/22* | (2006.01) |
| *F01M 1/02* | (2006.01) |
| *F01M 1/16* | (2006.01) |
| *F01M 5/00* | (2006.01) |
| *F15B 20/00* | (2006.01) |

(52) U.S. Cl.
CPC ............. *F01M 5/002* (2013.01); *F04B 23/02* (2013.01); *F04B 23/04* (2013.01); *F04B 49/002* (2013.01); *F15B 20/007* (2013.01); *F16H 57/0436* (2013.01); *F16H 57/0441* (2013.01); *F16H 61/0031* (2013.01); *F16H 61/4078* (2013.01); *E02F 9/2292* (2013.01); *E02F 9/2296* (2013.01); *F01M 2001/0246* (2013.01); *F01M 2001/0253* (2013.01); *F16H 2061/0037* (2013.01)

(56) References Cited

U.S. PATENT DOCUMENTS

| | | | | |
|---|---|---|---|---|
| 5,313,795 | A | * | 5/1994 | Dunn .................... E02F 9/2217 60/413 |
| 5,615,553 | A | * | 4/1997 | Lourigan ............. F15B 11/162 60/422 |
| 5,875,630 | A | * | 3/1999 | Walsh ...................... B62D 5/07 60/421 |
| 5,975,257 | A | * | 11/1999 | Roach .................... B62D 5/062 188/264 F |
| 6,176,083 | B1 | * | 1/2001 | Ikari ..................... E02F 9/2235 60/327 |
| 2009/0158727 | A1 | * | 6/2009 | Bitter ...................... F04B 23/04 60/428 |
| 2010/0126163 | A1 | | 5/2010 | Yoshida et al. |
| 2011/0272239 | A1 | | 11/2011 | Yoshikawa et al. |
| 2013/0152565 | A1 | | 6/2013 | Ma et al. |
| 2014/0060681 | A1 | * | 3/2014 | Hwang ................... F16H 61/38 137/565.3 |
| 2014/0174570 | A1 | * | 6/2014 | Kanehara ................ F15B 15/20 137/565.16 |
| 2015/0027570 | A1 | * | 1/2015 | Wi .......................... F04B 49/24 137/563 |
| 2015/0047335 | A1 | * | 2/2015 | Takahashi ........... F16H 61/4139 60/428 |
| 2016/0069447 | A1 | | 3/2016 | Filippin et al. |
| 2016/0116053 | A1 | * | 4/2016 | Nystrom ............. F16H 57/0435 184/6.1 |

* cited by examiner

HYDRAULIC CIRCUIT FOR USE ON CVT VEHICLE

BACKGROUND OF THE INVENTION

The present invention relates to vehicles having high pressure hydraulic circuits used for high pressure hydraulic devices such as hydraulic steering, brake valves, or hydraulic actuators, medium pressure hydraulic circuits used for a hydrostatic or geared transmission, and/or low pressure hydraulic circuits used for lubrication. More specifically, the present invention relates to work vehicles having high, medium, and low pressure hydraulic circuits.

Work vehicles are used in many different vocations, including agriculture, construction, industrial, and forestry, as non-limiting examples. These work vehicles can take many forms, such as backhoe loaders, wheel loaders, forestry fellers, skidders, harvesters, sprayers, application equipment, utility vehicles, agricultural tractors, and compact tractors. Often, these work vehicles have multiple hydraulic devices with differing requirements in terms of pressure and flow in order to function correctly. In order to provide for these requirements, a hydraulic circuit usually has multiple pumps of varying pressure and volume capacities, along with pressure relief or control valves, so that the demands of the multiple hydraulic devices are met at the appropriate pressures and flows.

More specifically, it is known to provide three levels of hydraulic pressure and flow in a hydraulic circuit of a work vehicle. A low pressure portion of the hydraulic circuit is used for lubrication. A medium pressure portion of the hydraulic circuit is used for a hydrostatic, continuously variable, gear, or other type of transmission, along with other miscellaneous medium pressure hydraulic needs of the work vehicle. A high pressure portion of the hydraulic circuit is used for hydraulic steering devices, brake valves, and for hydraulic actuators, including hydraulic actuators connected directly to the work vehicle, and including hydraulic actuators remotely connected to the work vehicle, such as those used on agricultural implements.

In order to accomplish this, known hydraulic systems used a non-adjustable positive displacement charge pump to supply hydraulic fluid at relatively low pressure and high volume. The low pressure high volume hydraulic fluid was then partially routed to a medium pressure pump that supplied the medium pressure needs of the work vehicle. The low pressure high volume hydraulic fluid was also partially routed to the lubrication circuits of the work vehicle by way of a hydraulic oil cooler and a pressure reducing valve. The low pressure high volume hydraulic fluid was also partially routed to a high pressure pump that supplied the high pressure needs of the work vehicle, also by way of the hydraulic oil cooler and pressure reducing valve.

While the non-adjustable positive displacement charge pump had a fixed displacement, the high pressure pump was routinely a closed center load sensing, in other words adjustable, pump that reacted to the demands of a priority valve supplying hydraulic pressure to the hydraulic steering devices, brake valve, and/or hydraulic actuators. The medium pressure pump may also have been variable displacement. As a result, much of the output of the non-adjustable positive displacement charge pump was often wasted, recirculating all flow not required at a particular moment by the lubrication circuits, the medium pressure pump, or the high pressure pump. Further, some of the output of the non-adjustable positive displacement charge pump that was in fact being used, required the use of inefficient pressure reducing valves due to the design of the known hydraulic systems. This wasted output and the unneeded pressurization, and possibly de-pressurization and/or re-pressurization, directly results in hydraulic noise, wasted engine power, fuel inefficiency, and unnecessary heating of the hydraulic fluid. Further, insofar as the lubrication circuits required hydraulic supply at a given moment, the non-adjustable positive displacement charge pump raised the hydraulic pressure unnecessarily high, requiring the aforementioned pressure reducing valve, and further contributing to power losses and heating.

Furthermore, the amount of hydraulic fluid passing through the hydraulic oil cooler was only passively controlled by the relative pressure drops across components of the hydraulic system, so that sometimes too little flow and often too much flow passed through the hydraulic oil cooler. This further resulted in hydraulic noise and inefficiency, along with insufficient or excessive cooling of the hydraulic fluid.

Presently, specific legislative requirements and general market demands require work vehicles to achieve reduced power consumption, increased fuel efficiency, reduced exhaust emissions, and quieter operation. Therefore, it has become increasingly important to minimize the aforementioned noise, wasted power, fuel inefficiency, and excessive heat generation.

What is needed in the art is a cost-effective and energy efficient hydraulic circuit for a work vehicle.

SUMMARY OF THE INVENTION

The present invention provides three levels of hydraulic pressure and flow in a work vehicle, including the low pressure for low pressure lubrication hydraulic circuits, the medium pressure for medium pressure transmission or other miscellaneous hydraulic circuits, and the high pressure for the steering device, brake valve, or hydraulic actuators hydraulic circuits. One embodiment of the present invention does this using a variable displacement charge pump that is dedicated to the high pressure hydraulic circuit and that feeds hydraulic pressure and flow to a high pressure variable displacement pump. The high pressure variable displacement pump, in turn, supplies the high pressure hydraulic circuit. A medium pressure variable displacement pump supplies the medium pressure hydraulic circuit and draws directly from the reservoir, rather than from the variable displacement charge pump.

An entirely separate low pressure hydraulic circuit, sharing only the reservoir, is supplied by a low pressure variable displacement pump. In an alternate embodiment of the present invention, the low pressure hydraulic circuit is supplied by dual low pressure variable displacement pumps. In both embodiments of the low pressure hydraulic circuit, a proportional thermal valve proportionately controls flow through a hydraulic oil cooler and/or a hydraulic oil cooler bypass according to actual need for cooling the hydraulic fluid. Appropriate pre- and post-filters, check valves, sense lines, and pressure relief valves may be provided for each of the variable displacement pumps of the low pressure, medium pressure, and high pressure hydraulic circuits.

The invention in one form is directed to a hydraulic system of a work vehicle having an engine. The hydraulic system has a high pressure hydraulic circuit for providing high pressure hydraulic fluid to at least one hydraulic steering device, hydraulic actuator, or trailer brake valve of the work vehicle, and/or a medium pressure hydraulic circuit for providing medium pressure hydraulic fluid to at least one hydrostatic or Continuously Variable (CV) transmission, geared transmission, or medium pressure hydraulic service of the work vehicle. The hydraulic system also has a low pressure hydraulic circuit for providing low pressure hydraulic fluid to at least one vehicle lubrication circuit of the work vehicle. The high pressure hydraulic circuit has a charge pump that draws hydraulic fluid from a reservoir. The charge pump provides pressurized hydraulic fluid only to a high pressure variable displacement pump. The high pressure variable displacement pump further pressurizes the hydraulic fluid and provides the further pressurized hydraulic fluid to a priority valve according to demand of the hydraulic steering device, hydraulic actuator, or trailer brake valve. The medium pressure hydraulic circuit has a medium pressure variable displacement pump that draws hydraulic fluid from the reservoir and provides pressurized hydraulic fluid to the hydrostatic or CV transmission, to the geared transmission, or to the medium pressure hydraulic services according to demand of the hydrostatic or CV transmission, geared transmission, or medium pressure hydraulic services. The low pressure hydraulic circuit has at least one low pressure variable displacement pump and no charge pump. The at least one low pressure variable displacement pump draws hydraulic fluid from the reservoir and provides pressurized hydraulic fluid to the at least one vehicle lubrication circuit by way of a hydraulic oil cooler and/or a hydraulic oil cooler bypass. The flow of hydraulic fluid through the hydraulic oil cooler and/or through the hydraulic oil cooler bypass, which are configured in parallel, is controlled by a proportional valve.

The invention in another form is directed to a method of supplying hydraulic fluid within a work vehicle having an engine. The method includes several steps. The first step is providing high pressure hydraulic fluid using a high pressure hydraulic circuit to a hydraulic steering device, a hydraulic actuator, or a trailer brake valve, and/or providing medium pressure hydraulic fluid using a medium pressure hydraulic circuit to a hydrostatic or Continuously Variable (CV) transmission, a geared transmission, or a medium pressure hydraulic service. The first step may include drawing hydraulic fluid from a reservoir using a charge pump within the high pressure hydraulic circuit, providing pressurized hydraulic fluid only to a high pressure variable displacement pump using the charge pump, further pressurizing the hydraulic fluid using the high pressure variable displacement pump, and providing the further pressurized hydraulic fluid to a priority valve according to demand of the hydraulic steering device, hydraulic actuator, or trailer brake valve. The first step may also or alternately include drawing hydraulic fluid from the reservoir and providing pressurized hydraulic fluid to the hydrostatic or CV transmission, geared transmission, or medium pressure hydraulic service according to demand of the hydrostatic or CV transmission, geared transmission, or medium pressure hydraulic service using a medium pressure variable displacement pump within the medium pressure hydraulic circuit. The second step is providing low pressure hydraulic fluid using a low pressure hydraulic circuit to at least one vehicle lubrication circuit. The second step may include drawing hydraulic fluid from the reservoir and providing pressurized hydraulic fluid to the at least one vehicle lubrication circuit using dual low pressure variable displacement pumps and no charge pump within the low pressure hydraulic circuit. The dual low pressure variable displacement pumps may provide pressurized hydraulic fluid to the at least one vehicle lubrication circuit by way of at least one of a hydraulic oil cooler and a hydraulic oil cooler bypass, the hydraulic oil cooler and hydraulic oil cooler bypass being configured in parallel and being controlled by a proportional valve. The third step is further providing the dual low pressure variable displacement pumps with a dual low pressure pump sense line and dual low pressure hydraulic circuit relief valves. The dual low pressure hydraulic circuit relief valves may be set to relieve hydraulic pressure exceeding about 12 bar, and the dual low pressure variable displacement pumps may be set to provide hydraulic pressure up to about 12 bar. The fourth step is controlling the dual low pressure variable displacement pumps so that up to the total hydraulic output of one low pressure variable displacement pump is used to meet the needs of the vehicle lubrication circuits, and so that the other low pressure variable displacement pump is used when additional flow is required to meet cooling needs of the work vehicle.

An advantage of the present invention is that it provides the needed three levels of hydraulic pressure and flow without excessively recirculating pressurized hydraulic fluid, thereby minimizing unwanted hydraulic noise, conserving engine power, and increasing overall fuel economy. Another advantage is that the present invention avoids unnecessary heating of the hydraulic fluid, while controlling the amount of hydraulic fluid that passes through the hydraulic oil cooler so that the hydraulic circuits are cooled according to their actual requirements, thereby further reducing hydraulic noise and energy wasting unneeded circulation.

A further advantage of the present invention is that the pumps may be sized and operated at their greatest efficiency. A further advantage of the present invention is that the hydraulic fluid is only pressurized to the level needed by each circuit of the system. A further advantage of the present invention is that each pump is driven by the engine of the work vehicle at a ratio that is most appropriate for that pump. A further advantage of the present invention is that it allows for more sophisticated control of each variable displacement pump, and thereby more efficient control of the hydraulic circuits. A further advantage of the present invention is that each hydraulic circuit reacts to instantaneous flow and pressure requirements, with the pumps adjusting to flow demand. Because of the dedicated pump size and pressure thresholds, an overall reduction of pressure deltas across the hydraulic circuits is achieved.

BRIEF DESCRIPTION OF THE DRAWINGS

The above-mentioned and other features and advantages of the invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "continuously variable transmission," "infinitely variable transmission," "hydrostatic transmission," "engine," and "drive wheels" are used principally throughout this specification for convenience but it is to be understood that these terms are not intended to be limiting. Thus, "continuously variable transmission," "infinitely variable transmission," or "hydrostatic transmission" refers to a variable transmission requiring hydraulic flow and/or pressure, but should not be construed as limiting and may represent any variable ratio connection between a power supply and a motion output, such as wheels. "Engine" refers to an internal combustion engine, but should not be construed as limiting and may represent an external combustion engine, an electric, hydraulic, or pneumatic, or other rotational power producing device. "Drive wheels" refers to round wheels, but again, they should not be construed as limiting and may represent tracks or other ground running tractive devices. Furthermore, embodiments illustrated are shown as being applicable to primarily work vehicles. However, this also is not to be construed as limiting, as the principles to which this disclosure is directed may be embodied on any ground travelling vehicle, and such ground travelling vehicle may fall within the limits of the appended claims.

Figure 1:
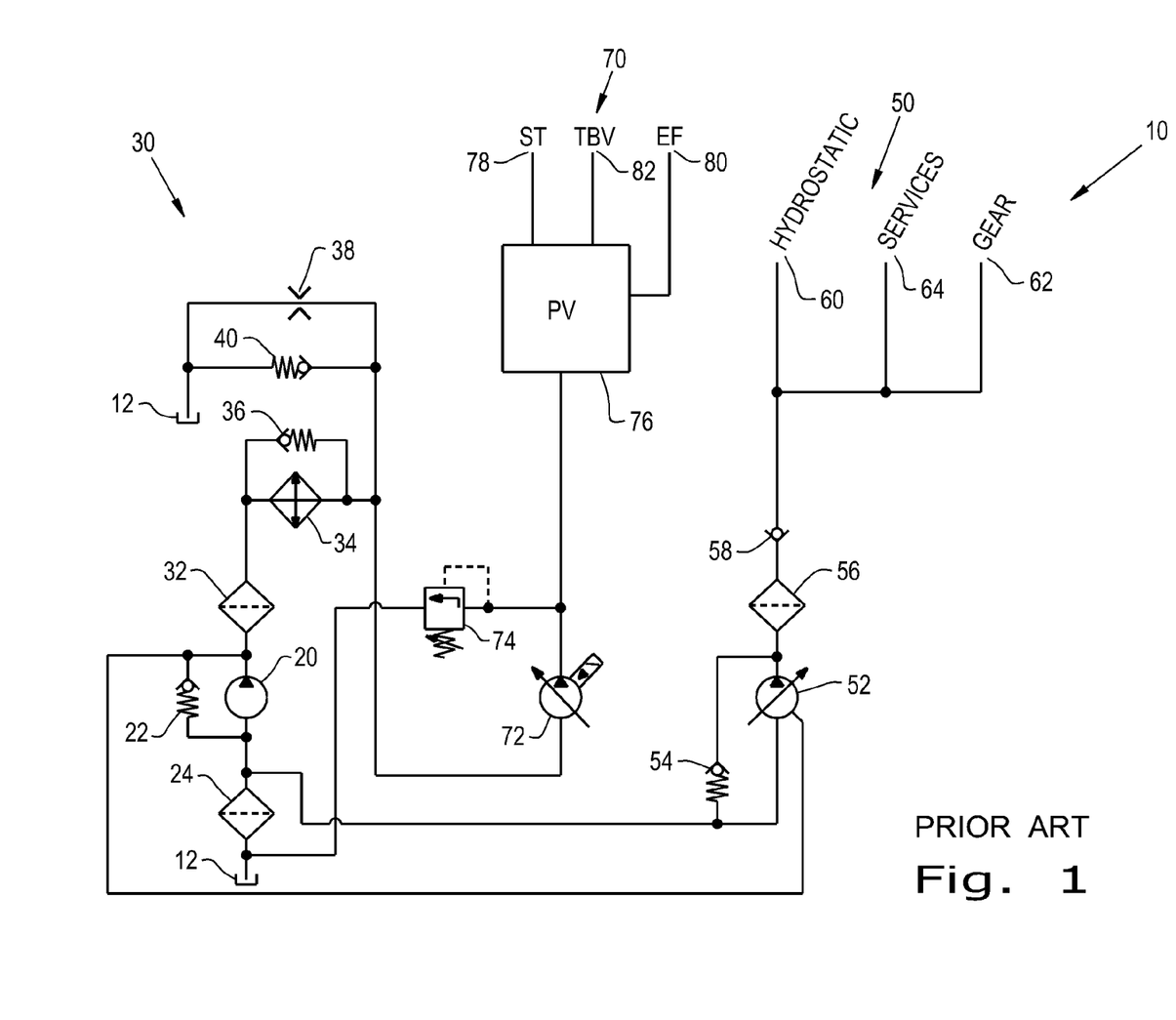
FIG. 1 is a graphical representation of a prior art hydraulic system of a work vehicle.

Referring now to the drawings, and more particularly to FIG. 1, there is shown a prior art hydraulic system 10 used to provide three levels of hydraulic pressure and flow in a work vehicle. A non-adjustable positive displacement charge pump 20 draws hydraulic fluid from a reservoir 12 through a pickup filter 24 and provides it to a low pressure hydraulic circuit 30, to a medium pressure hydraulic circuit 50, and to a high pressure hydraulic circuit 70. The non-adjustable positive displacement charge pump 20, which has a charge pump pressure relief valve 22, provides the hydraulic fluid to the low pressure hydraulic circuit 30 and to the high pressure hydraulic circuit 70 by way of a common hydraulic circuit passing through a low pressure hydraulic circuit filter 32 and at least partially through a hydraulic oil cooler 34, which hydraulic oil cooler 34 is in parallel with a low pressure hydraulic circuit relief and bypass valve 36.

Part of the hydraulic fluid then passes to the low pressure hydraulic circuit 30, passing through the vehicle lubrication circuits 38, which are in parallel with a vehicle lubrication circuit pressure relief valve 40, before returning to the reservoir 12. Another part of the hydraulic fluid then passes to the high pressure hydraulic circuit 70 by way of a closed center load sensing high pressure variable displacement pump 72. The closed center load sensing high pressure variable displacement pump 72 has a high pressure hydraulic circuit relief valve 74 and is regulated by demand from a hydraulic steering device 78, trailer brake valve 82, and/or hydraulic actuators 80 which are controlled by a priority valve 76.

Another hydraulic circuit is supplied by the non-adjustable positive displacement charge pump 20 and provides hydraulic fluid to the medium pressure hydraulic circuit 50 by way of a medium pressure variable displacement pump 52. The medium pressure variable displacement pump 52 has a medium pressure hydraulic circuit relief valve 54, and provides hydraulic fluid to a hydrostatic or CV transmission 60, to a geared transmission 62, and/or to other medium pressure hydraulic services 64, by way of a medium pressure hydraulic circuit filter 56 and a check valve 58.

Because the non-adjustable positive displacement charge pump 20 is non-adjustable, much of its output is wasted through recirculation at any particular moment when it exceeds the hydraulic inflow requirements of the medium pressure variable displacement pump 52, of the closed center load sensing high pressure variable displacement pump 72, and of low pressure hydraulic circuit 30. This constant unnecessary pumping and recirculation of hydraulic fluid directly results in hydraulic noise, wasted engine power, fuel inefficiency, and unnecessary heating of the hydraulic fluid. Further, because the amount of hydraulic fluid passing through the hydraulic oil cooler 34 is only passively controlled by the relative pressure drops across the hydraulic oil cooler 34 and the low pressure hydraulic circuit relief and bypass valve 36, and by the amount of output of the non-adjustable positive displacement charge pump 20 not being demanded at that moment by at least the medium pressure hydraulic circuit 50 as compared to the amount being demanded by the low pressure hydraulic circuit 30 and by the high pressure hydraulic circuit 70, sometimes too little hydraulic flow passes through the hydraulic oil cooler 34, and often too much hydraulic flow passes through the hydraulic oil cooler 34. This unneeded hydraulic flow again wastes energy and fuel. Further, at least part of the hydraulic flow pressurized by the non-adjustable positive displacement charge pump 20 is then at least partially de-pressurized by the low pressure hydraulic circuit relief and bypass valve 36, and then re-pressurized by the high pressure variable displacement pump 72, again resulting in losses and heat.

Figure 2:
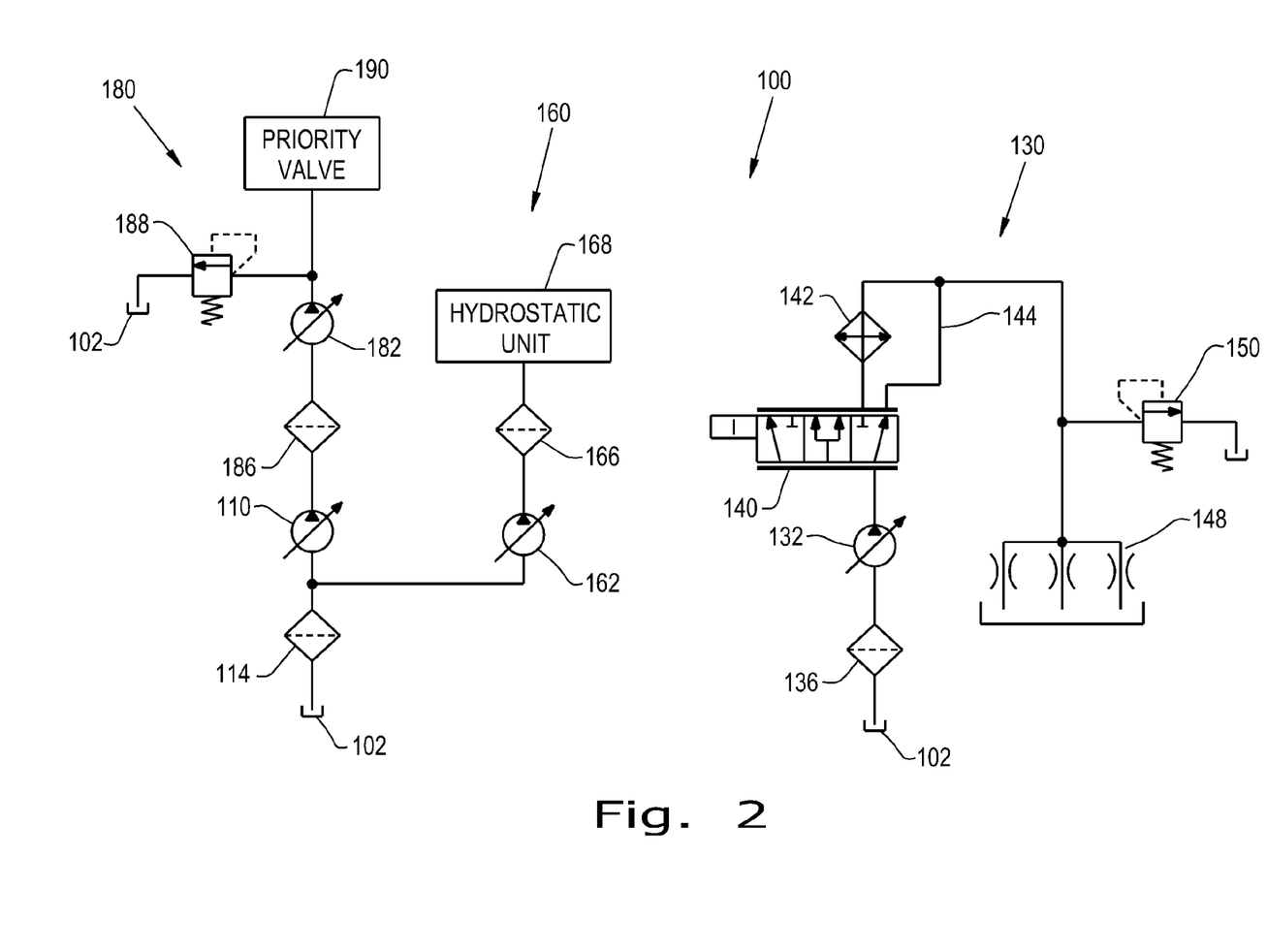
FIG. 2 is a graphical representation of an embodiment of the invention, a hydraulic system of a work vehicle.
Figure 3:
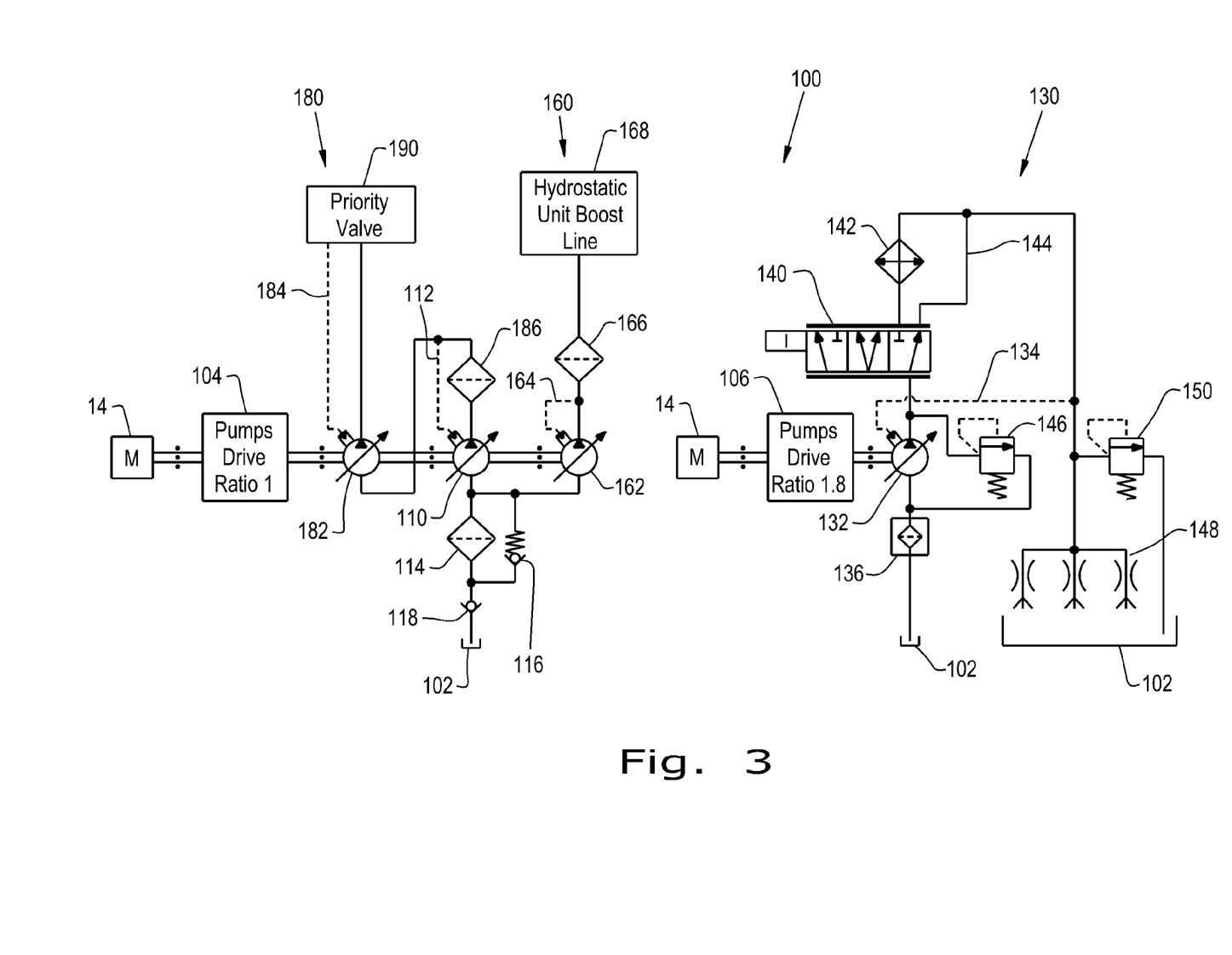
FIG. 3 is a graphical representation of an embodiment of the invention, a hydraulic system of a work vehicle.

Turning now to FIGS. 2 and 3, there is shown and illustrated a graphical representation of an embodiment of the invention, a hydraulic system 100 for a work vehicle. Each of the graphical representations shown in FIGS. 2 and 3 show certain elements of the embodiment of the invention, although it is to be understood that, for the sake of clarity, not every element of the invention is shown in both figures. The hydraulic system 100 is again provided with a low pressure hydraulic circuit 130, a medium pressure hydraulic circuit 160, and a high pressure hydraulic circuit 180. Except for the common reservoir 102, the low pressure hydraulic circuit 130 is now completely separate from the medium pressure hydraulic circuit 160 and the high pressure hydraulic circuit 180. A medium and high pressure pump drive unit 104, which may have a drive ratio of 1.0, provides rotational power from engine 14 to a variable displacement charge pump 110, to a medium pressure variable displacement pump 162, and to a high pressure variable displacement pump 182. Similarly, a low pressure pump drive unit 106, which may have a drive ratio of 1.8, provides rotational power from engine 14 to a low pressure variable displacement pump 132.

The variable displacement charge pump 110 of high pressure hydraulic circuit 180 draws hydraulic fluid from reservoir 102 through a pickup filter 114 and a check valve 118, which pickup filter 114 has a pickup filter bypass valve 116. The variable displacement charge pump 110, which may be between about 100 cubic centimeters (cc) maximum displacement and about 145 cc maximum displacement, uses a charge pump sense line 112 to sense demand for hydraulic flow and pressure from the high pressure variable displacement pump 182. The hydraulic fluid output from the variable displacement charge pump 110 passes through a high pressure hydraulic circuit filter 186 before proceeding to a the high pressure variable displacement pump 182. The high pressure variable displacement pump 182 of high pressure hydraulic circuit 180, in turn, which may be about 85 cc maximum displacement, uses a high pressure pump sense line 184 extending from a priority valve 190 to sense demand for hydraulic flow and pressure from the priority valve 190. The high pressure variable displacement pump 182 responds to demand from the hydraulic steering device 78, trailer brake valve 82, and/or hydraulic actuators 80 (not shown) by providing hydraulic flow and pressure to the priority valve 190, and is protected by a high pressure hydraulic circuit relief valve 188. The high pressure hydraulic circuit relief valve 188 may, for example, be set to relieve pressure exceeding 245 bar, and the high pressure variable displacement pump 182 may be set to provide hydraulic pressure up to about 245 bar.

The medium pressure variable displacement pump 162 of medium pressure hydraulic circuit 160 also draws hydraulic fluid from reservoir 102 through pickup filter 114 and check valve 118. The medium pressure variable displacement pump 162 may be about 45 cc maximum displacement. The medium pressure variable displacement pump 162 uses a medium pressure pump sense line 164 to sense demand for hydraulic flow and pressure from the hydrostatic or CV transmission 168, or from geared transmission 62 or other medium pressure hydraulic service 64 (not shown), which hydraulic flow passes through medium pressure hydraulic circuit filter 166. The medium pressure variable displacement pump 162 may be set to provide hydraulic pressure up to about 28 bar.

The low pressure variable displacement pump 132 of low pressure hydraulic circuit 130, which may be about 35 cc maximum displacement, draws hydraulic fluid from reservoir 102 separately through low pressure hydraulic circuit pickup filter 136. The low pressure variable displacement pump 132 uses a low pressure pump sense line 134 to sense demand for hydraulic flow and pressure from vehicle lubrication circuits 148. The low pressure variable displacement pump 132 may be protected by a low pressure hydraulic circuit relief valve 146. The low pressure hydraulic circuit relief valve 146 may, for example, be set to relieve pressure exceeding between about 12 and 15 bar, and the low pressure variable displacement pump 132 may be set to provide hydraulic pressure up to between about 12 and about 15 bar. Before passing to the vehicle lubrication circuits 148 protected by vehicle lubrication circuit pressure relief valve 150, the hydraulic flow provided by the low pressure variable displacement pump 132 passes through a hydraulic oil cooler 142 or through a hydraulic oil cooler bypass 144, in proportion as controlled by proportional thermal valve 140. The vehicle lubrication circuit pressure relief valve 150 may, for example, be set to relieve pressure exceeding about 3.2 bar. Only an appropriate amount of hydraulic flow is allowed to pass through the hydraulic oil cooler 142 in order to provide the required amount of cooling to the hydraulic fluid of the hydraulic system 100. In this way, the hydraulic system 100 is cooled according to its actual requirements, and unnecessary and energy wasting flow through the hydraulic oil cooler 142 is minimized.

As can be seen, only the amount of hydraulic flow and pressure that is needed by the low pressure hydraulic circuit 130 to supply the vehicle lubrication circuits 148 and/or the hydraulic oil cooler 142 is pumped by the low pressure variable displacement pump 132. Only the amount of hydraulic flow and pressure that is needed by the medium pressure hydraulic circuit 160 to supply the hydrostatic or CV transmission 168, or to supply the geared transmission 62 or other medium pressure hydraulic service 64 (not shown), is pumped by the medium pressure variable displacement pump 162. Only the amount of hydraulic flow and pressure that is needed by the high pressure hydraulic circuit 180 to supply the hydraulic steering device 78, trailer brake valve 82, and/or hydraulic actuators 80 (not shown) controlled by the priority valve 190 is pumped by the variable displacement charge pump 110 and by the high pressure variable displacement pump 182. In this way, unnecessary pumping and recirculation of hydraulic fluid is minimized, resulting in reduced hydraulic noise, less wasted engine power, greater fuel efficiency, and limited heating of the hydraulic fluid.

Figure 4:
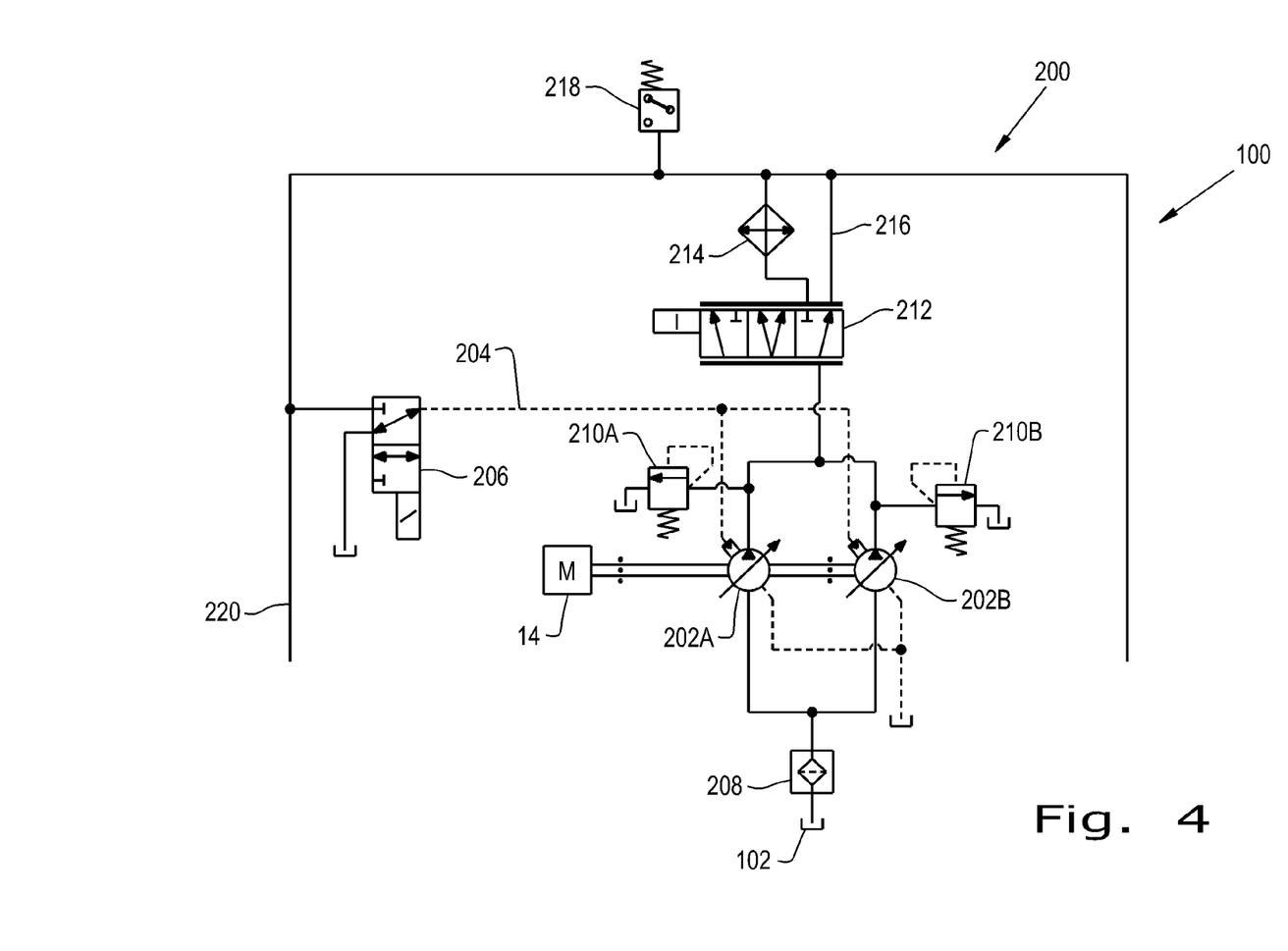
FIG. 4 is a graphical representation of an embodiment of the invention, a hydraulic system of a work vehicle.

Turning now to FIG. 4, an alternate embodiment of low pressure hydraulic circuit 200 is shown. Dual low pressure variable displacement pumps 202A, 202B driven by engine 14, which may be about 41 cc maximum displacement each, draw hydraulic fluid from reservoir 102 through a low pressure hydraulic circuit pickup filter 208. The dual low pressure variable displacement pumps 202A, 202B use a dual low pressure variable displacement pump sense line 204 which may have a dual low pressure variable displacement pump sense line valve 206 to sense demand for hydraulic flow and pressure from vehicle lubrication circuits 220. The dual low pressure variable displacement pumps 202A, 202B may be protected by low pressure hydraulic circuit relief valves 210A, 210B. The low pressure hydraulic circuit relief valves 210A, 210B may, for example, be set to relieve pressure exceeding about 12 bar, and the low pressure variable displacement pumps 202A, 202B may be set to provide hydraulic pressure up to about 12 bar.

Before passing to the vehicle lubrication circuits 220, which may be provided with a low pressure hydraulic circuit pressure transducer 218, the hydraulic flow provided by the dual low pressure variable displacement pumps 202A, 202B passes through a hydraulic oil cooler 214 or through a hydraulic oil cooler bypass 216, in proportion as controlled by proportional thermal valve 212. Only an appropriate amount of hydraulic flow is allowed to pass through the hydraulic oil cooler 214 in order to provide the required amount of cooling to the hydraulic fluid of the hydraulic system 100. Further, the dual low pressure variable displacement pumps 202A, 202B may be sized and controlled so that up to the total flow of one pump is used just to meet the needs of the vehicle lubrication circuits 220, whereas the other pump is used when additional flow is required to meet both lubrication and cooling needs. In this way, the hydraulic system 100 is cooled according to its actual requirements, unnecessary and energy wasting flow through the hydraulic oil cooler 214 is minimized, and the pumps are sized and operated at their greatest efficiency.

The invention claimed is:

1. A hydraulic system of a work vehicle having an engine, the hydraulic system comprising:
   a high pressure hydraulic circuit for providing high pressure hydraulic fluid to at least one of a hydraulic steering device, a hydraulic actuator, and a treadle brake valve, the high pressure hydraulic circuit has a charge pump drawing hydraulic fluid from a reservoir, the charge pump providing pressurized hydraulic fluid only to a high pressure variable displacement pump, the high pressure variable displacement pump further pressurizing the hydraulic fluid and providing the high pressure hydraulic fluid to a priority valve according to demand of the hydraulic steering device, hydraulic actuator, or treadle brake valve; and/or
   a medium pressure hydraulic circuit for providing medium pressure hydraulic fluid to at least one of a hydrostatic or Continuously Variable (CV) transmission, a geared transmission, and a medium pressure hydraulic service, the medium pressure hydraulic circuit has a medium pressure variable displacement pump drawing hydraulic fluid from the reservoir and providing the medium pressure hydraulic fluid to the hydrostatic or CV transmission, geared transmission, or medium pressure hydraulic service according to demand of the hydrostatic or CV transmission, geared transmission, or medium pressure hydraulic service; and a low pressure hydraulic circuit for providing low pressure hydraulic fluid to at least one vehicle lubrication circuit, and the low pressure hydraulic circuit has at least one low pressure variable displacement pump and no charge pump, the at least one low pressure variable displacement pump drawing hydraulic fluid from the reservoir and providing the low pressure hydraulic fluid to the at least one vehicle lubrication circuit by way of at least one of a hydraulic oil cooler and a hydraulic oil cooler bypass, the hydraulic oil cooler and hydraulic oil cooler bypass being configured in parallel and being controlled by a proportional valve.

2. The hydraulic system of claim 1, wherein:
at least one of the charge pump, the high pressure variable displacement pump, and
the medium pressure variable displacement pump being driven by the engine by way of a first drive unit; and
the low pressure variable displacement pump being driven by the engine by way of a second drive unit.

3. The hydraulic system of claim 2, wherein:
the first drive unit having a drive ratio of 1; and
the second drive unit having a drive ratio of 1.8.

4. The hydraulic system of claim 1, wherein:
the medium pressure hydraulic circuit and/or high pressure hydraulic circuit being hydraulically separate from the low pressure hydraulic circuit, except for the reservoir.

5. The hydraulic system of claim 1, wherein:
the medium pressure variable displacement pump of the medium pressure hydraulic circuit being further provided with a medium pressure pump sense line and being set to provide hydraulic pressure up to 28 bar; and/or
the high pressure variable displacement pump of the high pressure hydraulic circuit being further provided with a high pressure pump sense line and a high pressure hydraulic circuit relief valve, the high pressure hydraulic circuit relief valve being set to relieve hydraulic pressure exceeding 245 bar, and the high pressure variable displacement pump being set to provide hydraulic pressure up to 245 bar; and
the at least one low pressure variable displacement pump of the low pressure hydraulic circuit being further provided with at least one low pressure pump sense line and at least one low pressure hydraulic circuit relief valve, the at least one low pressure hydraulic circuit relief valve being set to relieve hydraulic pressure exceeding between 12 and 15 bar, and
the at least one low pressure variable displacement pump being set to provide hydraulic pressure up to between 12 and 15 bar.

6. The hydraulic system of claim 1, wherein:
the medium pressure variable displacement pump of the medium pressure hydraulic circuit being 45 cc maximum displacement; the charge pump of the high pressure hydraulic circuit being between 100 cc and 145 cc maximum displacement; and/or the high pressure variable displacement pump of the high pressure hydraulic circuit being 85 cc maximum displacement; and
the at least one low pressure variable displacement pump of the low pressure hydraulic circuit being 35 cubic centimeters (cc) maximum displacement.

7. The hydraulic system of claim 1, wherein:
the proportional valve of the low pressure hydraulic circuit further being a thermally controlled proportional valve.

8. The hydraulic system of claim 1, wherein:
the at least one low pressure variable displacement pump of the low pressure hydraulic circuit further comprising dual low pressure variable displacement pumps of the low pressure hydraulic circuit; and
the dual low pressure variable displacement pumps being further provided with a dual low pressure pump sense line and dual low pressure hydraulic circuit relief valves, the dual low pressure hydraulic circuit relief valves being set to relieve hydraulic pressure exceeding 12 bar, and
the dual low pressure variable displacement pumps being set to provide hydraulic pressure up to 12 bar.

9. The hydraulic system of claim 8, wherein:
the dual low pressure variable displacement pumps being controlled so that up to a total hydraulic output of one low pressure variable displacement pump is used to meet the needs of the vehicle lubrication circuits, whereas the other low pressure variable displacement pump is used when additional flow is required to meet cooling needs of the work vehicle.

10. The hydraulic system of claim 8, wherein:
the dual low pressure variable displacement pumps have a 41 cc maximum displacement.

11. The hydraulic system of claim 1, wherein:
the charge pump of the high pressure hydraulic circuit further comprises a variable displacement charge pump, the variable displacement charge pump further providing the pressurized hydraulic fluid only to the high pressure variable displacement pump according to demand of the high pressure variable displacement pump.

* * * * *